(12) United States Patent
Stanka et al.

(10) Patent No.: US 10,914,181 B2
(45) Date of Patent: Feb. 9, 2021

(54) BLADE OR VANE FOR TURBOMACHINE WITH DIFFERENT DIFFUSION PROTECTIVE COATINGS AND METHOD FOR MANUFACTURE THEREOF

(71) Applicant: MTU Aero Engines AG, Munich (DE)

(72) Inventors: Rudolf Stanka, Rattenkirchen (DE); Manfred Dopfer, Unterschleissheim (DE)

(73) Assignee: MTU Aero Engines AG, Munich (DE)

( * ) Notice: Subject to any disclaimer, the term of this patent is extended or adjusted under 35 U.S.C. 154(b) by 269 days.

(21) Appl. No.: 16/051,927

(22) Filed: Aug. 1, 2018

(65) Prior Publication Data

US 2019/0040750 A1 Feb. 7, 2019

(30) Foreign Application Priority Data

Aug. 4, 2017 (DE) .......................... 10 2017 213 553

(51) Int. Cl.
*F01D 5/28* (2006.01)
*C23C 10/56* (2006.01)
*C23C 28/02* (2006.01)

(52) U.S. Cl.
CPC .............. *F01D 5/288* (2013.01); *C23C 10/56* (2013.01); *C23C 28/022* (2013.01); *F05D 2230/90* (2013.01); *F05D 2260/95* (2013.01); *F05D 2300/121* (2013.01); *F05D 2300/132* (2013.01); *F05D 2300/173* (2013.01)

(58) Field of Classification Search
CPC ....... F01D 5/288; C23C 28/022; C23C 10/56; F05D 2300/132; F05D 2300/121; F05D 2300/173; F05D 2300/90; F05D 2260/95
See application file for complete search history.

(56) References Cited

U.S. PATENT DOCUMENTS 5,490,764 A * 2/1996 Schilling ................... F01D 5/16
416/239
6,283,715 B1 9/2001 Nagaraj et al.
(Continued)

FOREIGN PATENT DOCUMENTS

DE 10013373 A1 * 9/2001 .............. B23P 15/04
DE 102008039969 A1 3/2010
(Continued)

*Primary Examiner* — David E Sosnowski
*Assistant Examiner* — Danielle M. Christensen
(74) *Attorney, Agent, or Firm* — Barlow, Josephs & Holmes, Ltd.

(57) ABSTRACT

The present invention relates to a blade or vane for a turbomachine, particularly for an aircraft engine, with a blade element for interacting with the flow medium, wherein the blade has different diffusion protective coatings in various regions on its surface for protection against corrosion and/or oxidation, wherein the diffusion protective coatings are produced by chromizing and/or aluminizing, wherein the blade element is divided into two regions along the longitudinal axis of the blade element, wherein the first region extends over 80 to 95% of the length of the blade element, and the second region extends over the remainder of the length of the blade element, and wherein in both regions, an AlCr diffusion protective coating is applied, and wherein in one of the regions, the AlCr diffusion protective coating has a higher Cr content.

12 Claims, 1 Drawing Sheet

(56) References Cited

U.S. PATENT DOCUMENTS

| | | | |
|---|---|---|---|
| 7,371,428 B2 | 5/2008 | Russo et al. | |
| 8,277,195 B2 | 10/2012 | Box et al. | |
| 2007/0264126 A1 | 11/2007 | Box et al. | |
| 2014/0044938 A1* | 2/2014 | Pillhoefer | ............... C23C 10/50 428/209 |
| 2014/0287143 A1 | 9/2014 | Murphy et al. | |
| 2015/0197841 A1 | 7/2015 | Tang et al. | |
| 2016/0010472 A1 | 1/2016 | Murphy et al. | |
| 2017/0058390 A1 | 3/2017 | Tang et al. | |

FOREIGN PATENT DOCUMENTS

| | | |
|---|---|---|
| DE | 102014222024 A1 | 6/2016 |
| EP | 0139396 A1 | 5/1985 |
| EP | 1790753 A1 | 5/2007 |
| EP | 2631325 A2 | 8/2013 |
| EP | 2695964 A1 | 2/2014 |
| EP | 2695965 A2 | 2/2014 |
| EP | 2778251 A1 | 9/2014 |
| EP | 2024607 B1 | 10/2014 |
| GB | 2401117 A | 11/2004 |
| WO | 2005106064 A1 | 11/2005 |
| WO | 2006061431 A2 | 6/2006 |
| WO | 2007140805 A1 | 12/2007 |
| WO | 2007147708 A2 | 12/2007 |
| WO | 2015047783 A1 | 4/2015 |
| WO | 2015108766 A1 | 7/2015 |
| WO | 2017040111 A1 | 3/2017 |

\* cited by examiner

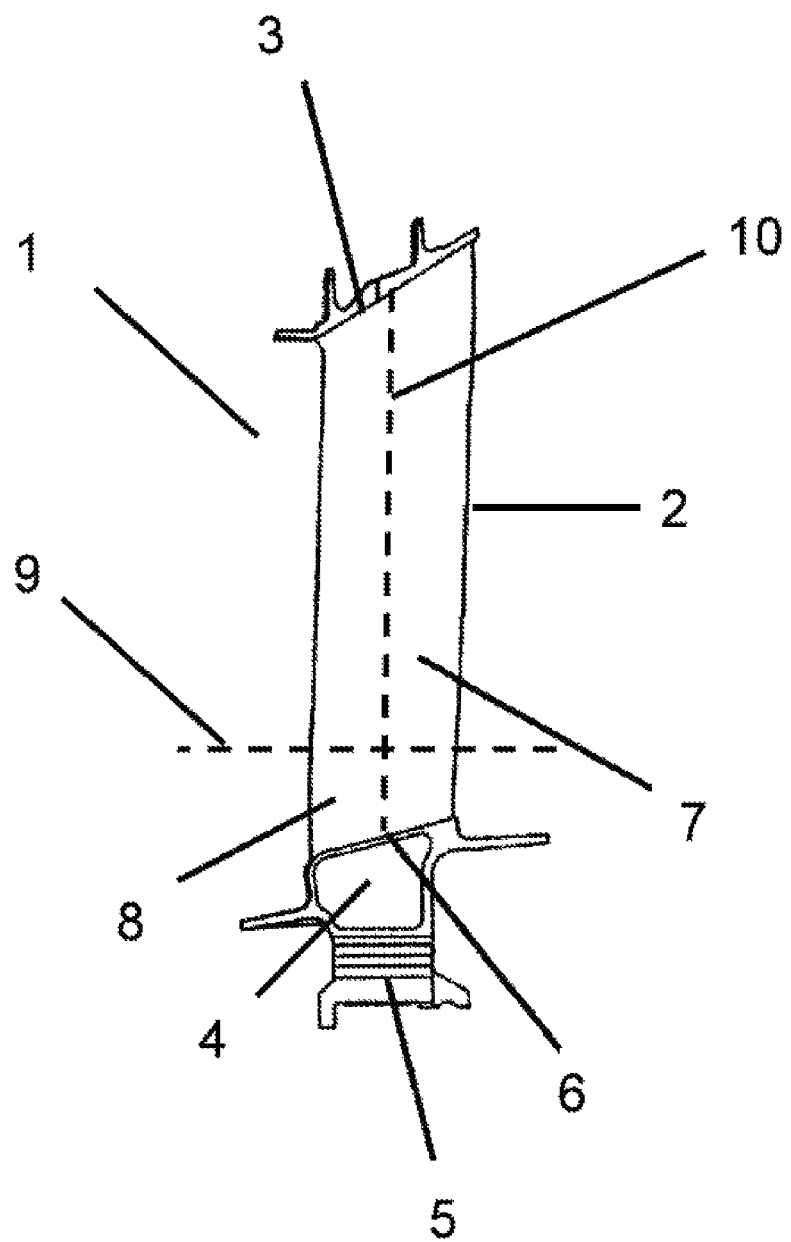

BLADE OR VANE FOR TURBOMACHINE WITH DIFFERENT DIFFUSION PROTECTIVE COATINGS AND METHOD FOR MANUFACTURE THEREOF

BACKGROUND OF THE INVENTION

The present invention relates to a blade or vane for a turbomachine, in particular for an aircraft engine, according to the preamble of claim 1. Furthermore, the present invention relates to a method for the manufacture of a corresponding blade or vane.

In turbomachines such as stationary gas turbines or aircraft engines, components such as, for example, guide vanes or rotating blades are exposed to both high temperatures as well as aggressive media or atmospheres that cause different types of damage, such as particle erosion, corrosion, and high-temperature oxidation. Correspondingly, it is necessary to protect the components as much as possible against all such damage, whereby under certain circumstances, compromises must be made, since protective measures that are promising for one type of damage, may themselves allow exposure to significant damage by other damage mechanisms.

For example, it has previously not been successful to satisfactorily provide protective measures against different corrosion and oxidation attacks at the same time. Thus, in the case of gas turbines or aircraft engines, in components that are exposed to operating temperatures in the range of 550 to 750° C., corrosion and sulfidation attacks of so-called type 2 corrosion take place under alkaline or alkaline-earth depositions. A planar material attack at temperatures between 750° C. and 900° C. in the presence of sulfur-containing and chloride-containing potassium, sodium, and calcium salts is called type 1 corrosion. At temperatures above 900° C., in the case of nickel-based and cobalt-based casting alloys, which are frequently used for components in correspondingly hot regions of a gas turbine or an aircraft engine, an oxidation attack predominates.

Since it has not previously been successful to provide a standardized protective measure for the different damage mechanisms, it has already been proposed to provide different protective measures in different regions of the corresponding component, such as a turbine blade or vane, for example. In the European Patent Application EP 2 695 964 A1, it is described that a first surface coating with a first composition is arranged in the root region and/or shroud region, a second surface coating with a second composition that is different from the first composition is arranged in the region of the blade element, and a third surface coating with a composition that is different from the first and second compositions is arranged in the root/blade element transition region and/or the blade element/shroud transition region, in order to counteract the different types of damage. Of course, in addition, there exists the need for improvement in order to reduce this oxidation and/or corrosion.

SUMMARY OF THE INVENTION

It is thus the object of the present invention to provide improved blades or vanes for turbomachines, in particular aircraft engines, which can better withstand the different corrosion and oxidation attacks. At the same time, such blades or vanes should be reliable and able to be used over a long service life, and they should be easy to manufacture.

This object is achieved by a blade or vane for a turbomachine as well as by a method of the present invention. Advantageous embodiments are discussed in detail below.

The invention proposes, for protection from oxidation and corrosion, to provide two regions having different AlCr diffusion protective coatings on a blade or vane for a turbomachine in the region of the blade element, wherein the first region extends over 80 to 95% of the length of the blade element and the second region extends over the remainder of the length of the blade element, and wherein in one of the regions, the AlCr diffusion protective coating has a higher chromium content. A customized protective coating for corrosion, particularly sulfidation, as well as oxidation, can be adjusted in a particularly good way with such an asymmetric coating of the blade element of a blade or vane of a turbomachine.

If the blade has a shroud at one end of the blade element, the latter can have the same diffusion protective coating as the adjacent region of the blade element. Additionally, the blade root for the arrangement of a rotating blade in a disc of the turbomachine and a blade platform that can be arranged between blade root and blade element for covering the blade root, as well as a blade neck that can be formed between blade root and blade element, can also be provided with diffusion protective coatings.

The diffusion protective coating on the blade platform can in turn be formed as an AlCr diffusion protective coating with a chromium percentage that is higher than in the AlCr diffusion protective coatings of the first and second regions of the blade element, whereas in the region of the blade root and the blade neck, Cr diffusion protective coatings can be introduced, that is, coatings not containing aluminum.

The blade can be designed so that the first region of the blade element extends over 90% of the length of the blade element and is arranged adjacent to the shroud, whereas the second region of the blade element is arranged in the direction of the blade root. Correspondingly, in the second region of the blade element, an AlCr diffusion protective coating with a higher chromium percentage than in the first region of the blade element can be provided.

The AlCr diffusion protective coating with a low Cr percentage, which can be arranged in the first region on the blade element and on the shroud, can have an aluminum percentage of 16 to 28 wt. % and a chromium percentage of at least 5 wt. %. The ratio of chromium to aluminum in this AlCr diffusion protective coating with low chromium percentage can lie in the range of less than or equal to 2, in particular in the range of less than or equal to 1.5.

In the second region of the blade element, an AlCr diffusion protective coating with a higher Cr percentage can be provided, which has an aluminum percentage of 12 to 28 wt. % and a Cr percentage of 24 to 85 wt. %. In this AlCr diffusion protective coating, the ratio of chromium to aluminum can lie in the range of greater than or equal to 1.3 to less than or equal to 4.4, and particularly in the range from greater than or equal to 2 to less than or equal to 3.6.

A third AlCr diffusion protective coating with a still higher Cr percentage can be provided on the blade platform and can have an aluminum percentage of at least 5 wt. % and a chromium percentage of 35 to 85 wt. %. In this diffusion protective coating, the ratio of chromium to aluminum can lie in the range of greater than or equal to 3, particularly in the range of greater than or equal to 3.6.

The diffusion protective coatings comprise constituents of the base alloy in addition to chromium in the Cr diffusion protective coatings as well as in addition to chromium and aluminum in the AlCr diffusion protective coatings. Additional elements that shall be provided in the diffusion coatings can also be placed in the initial materials for the diffusion protective coating and can correspondingly be deposited in the diffusion protective coatings.

The diffusion protective coatings can have a thickness in the range of 0.015 to 0.1 mm, wherein the AlCr diffusion protective coating can have, in particular, a thickness in the range of 0.04 to 0.1 mm. The Cr diffusion protective coating that can be provided on the blade root can have, in particular, a thickness in the range of 0.015 to 0.03 mm.

The diffusion protective coatings can be produced by chromizing and/or aluminizing on a semi-finished blade that already has the corresponding final contour of the blade.

BRIEF DESCRIPTION OF THE DRAWING FIGURE

FIG. 1 shows a schematic side view of a rotating blade of an aircraft engine according to the present invention.

DESCRIPTION OF THE INVENTION

Further advantages, characteristics and features of the present invention will become apparent in the following detailed description of an example of embodiment. Of course, the invention is not limited to this exemplary embodiment.

In the FIG. 1, a rotating blade 1 of an aircraft engine that has a blade element 2 and a blade root 5 is shown. A shroud 3 is arranged on the end of the blade element 2 lying opposite to the blade root 5. A blade neck 4 is formed between blade element 2 and blade root 5, and a blade platform 6 that projects laterally from the blade 1 is arranged on this neck.

The longitudinal axis 10 of the blade element, which is shown as a dashed line in FIG. 1, extends along the greatest dimension of the blade 1 or referred to the turbomachine, and the axis of rotation, around which the blade 1 is rotated, extends in the radial direction. The length of the blade element 2 that extends from the blade platform 6 up to the shroud 3 can be determined along the longitudinal axis 10 in the example of embodiment shown in FIG. 1. If the blade platform 6 and the shroud 3 do not run parallel to one another, the length of the blade element 2 can still be determined by using the length of the central longitudinal axis between blade platform 6 and shroud 3.

Crosswise to the longitudinal axis 10, another dashed line crosswise to the longitudinal axis is shown in FIG. 1. This additional line represents a dividing line 9 between a first region 7 and a second region 8 of the blade element 2, in which different diffusion protective layers are formed for the protection of the blade element from corrosion and oxidation.

In the blade 1 that is shown, a first diffusion protective coating, which has a high aluminum percentage and a low chromium percentage, is formed, namely by chromizing and aluminizing in a first surface region that comprises the first region 7 of the blade element 2 and the shroud 3. Another AlCr diffusion protective coating, which has, however, a higher chromium percentage in the diffusion protective coating than the first diffusion protective coating in the first region 7 of the blade element 2, is formed in the second region of the blade element 2.

Another AlCr diffusion protective coating that has a still higher chromium percentage is arranged on the top and bottom of the blade platform 6. In the region of the blade neck 4 and the blade root 5, AlCr diffusion protective coatings are no longer provided, but rather only Cr diffusion protective coatings. The Cr diffusion protective coating has a high chromium percentage in the region of the blade neck 4, whereas the Cr diffusion protective coating is formed very thin in the region of the blade root 5. The diffusion protective coating can have, for example, a thickness in the range of 0.015 to 0.030 in the region of the blade root 5, whereas the rest of the diffusion protective coatings, thus particularly the AlCr diffusion protective coatings in the remaining regions of blade 1 have layer thicknesses in the range of 0.04 to 0.1.

The aluminum—and chromium—percentages in the composition of the diffusion protective coating in the first region 7 of the blade element 2 can be in the range from 16 to 28 wt. % aluminum and at least 5 wt. % chromium for nickel-based alloys, such as PWA 1484, PWA 1480, Inconel 100, Inconel 713 and LEK94, which form the base material of the blade, wherein the ratio of chromium to aluminum can have a value of less than or equal to 2.2. The diffusion protective coating with average chromium content, which is arranged in the second region 8 of the blade element 2, can have an aluminum content of 12 to 28 wt. % and a chromium content of 24 to 85 wt. %, and has a chromium-aluminum ratio of greater than or equal to 2 and less than or equal to 4.4, whereas the diffusion protective coating with high chromium percentage in the region of the blade platform 6 can have an aluminum percentage of at least 5 wt. % and a chromium percentage of 35 to 85 wt. %, and has a chromium/aluminum ratio of greater than or equal to 3. If, however, for example, an MAR-M247 or MAR-M247LCDS alloy is used as the base material for the blade 1, then the chromium/aluminum ratio for the AlCr diffusion protective coating with low chromium percentage in the first region 7 of the blade element and on the shroud can be less than or equal to 1.5, whereas for the AlCr diffusion protective coating with average chromium percentage in the second region 8 of the blade element 2, it can be greater than or equal to 1.3 or less than or equal to 3.6. For alloys of this type, the AlCr diffusion protective coating with high chromium percentage on the blade platform 6 can have a chromium/aluminum ratio of greater than or equal to 3.6.

The diffusion protective coatings have, in addition to aluminum and chromium—or in the case of the Cr diffusion protective coatings, in addition to chromium—other elements of the base material of the blade, on which the diffusion protective coatings are introduced. These usually involve nickel-based or cobalt-based alloys, so that correspondingly high percentages of nickel or cobalt are contained in the diffusion protective coatings. Moreover, however, other alloy constituents of the base material may also be contained in the diffusion protective coating.

Corresponding aluminum—and/or chromium—coatings can be produced by carrying out a chromizing of the component surface to be protected in a first step part, and, if desired, then carrying out an aluminizing in a second step part. The chromizing and/or aluminizing can be carried out simultaneously, but differently, in various local regions of the component surface to be protected, in such a way that different diffusion protective coatings are formed in the various regions, corresponding to the different protection requirements.

The deposition of the chromium in the first step part of chromizing can be conducted by means of thermochemical methods, thermophysical methods, physical methods, or electrochemical methods.

Thermochemical methods are understood here to mean gas diffusion depositions, in which chromium is provided on the component surface utilizing temperature and chemical reactions, so that the chromium diffuses into the component and/or can deposit thereon.

In the case of PVD methods (physical vapor deposition), with the use of temperature, a vaporization of chromium with corresponding deposition is effected. In the case of electrochemical methods, by placement of an electrical potential, a deposition of chromium from an electrolyte is carried out. The deposition of chromium can also take place by means of dispersion coating. A combination of the two last-named methods is also conceivable. In this case, a covering layer can be produced by means of chemical and/or electrochemical deposition of chromium and additional constituents, such as, for example, nickel, and additionally incorporated particles.

The diffusion of chromium into the component surface for the formation of a chromium-rich coating can take place, after it is introduced onto the component surface to be protected, by way of a corresponding heat treatment, wherein, even in thermochemical and thermophysical methods, in which said introduction is already carried out at correspondingly high temperatures, and from this a diffusing of the chromium into the component surface is already made possible, in addition, a more extensive heat treatment for further diffusion of the chromium into deeper component regions can be conducted.

In the first step part of the chromizing, for the formation of the different regions of the protective coating in the various regions, different chromium contents can be deposited, for example, by applying materials containing chromium in different quantities or with different concentrations of chromium.

In the case of chromizing, different thicknesses of the coatings enriched with chromium can also be produced.

For the formation of a first, outer surface coating with high percentage of chromium, the chromizing can be carried out with a high chromium activity. This can be accomplished, for example, by the powder pack method or gas-phase chromizing.

The chromizing can take place, in particular, by way of a temperature treatment in the presence of liquid, chromium-rich slurry coatings, wherein the slurry can comprise chromium-containing powder with activators and binding agents. Alcohols or miscellaneous solvents come into consideration as binding agents, whereas halides can be employed as activators. The slurry can be applied via physical methods, such as brushing or spraying.

With use of chromium-containing slurries having chromium activities (chemical activity) of more than 0.4 or 40% for sub-regions with high chromium content of the AlCr coating to be produced, a chromium-rich coating can be formed by a thermal and/or thermochemical treatment in a temperature range from 1000° C. to 1180° C., particularly 1050° C. to 1100° C. over times from 2 to 20 hours, particularly 10 to 15 hours. The chromium-rich coating has here an outer a-chromium coating part and an inner solid solution coating essentially containing chromium and the principal constituents of the alloy of the coated component, e.g., nickel.

In general, the chromizing can be carried out in the first step part at a temperature from 1000° C. to 1180° C., particularly 1050° C. to 1130° C. over a time period from 1 to 20 hours, particularly 10 to 15 hours.

After the production of the chromium-rich coating, preferably with different chromium contents and/or different coating thicknesses in the various regions, the different AlCr coatings shall be obtained; the thus-treated base material is subjected to an aluminizing process, in which the blade is packed into a powder pack with high aluminum activity (chemical activity) in the range of greater than or equal to 0.15 or 15% and is treated thermally or thermochemically at temperatures of more than 1050° C. for a time of 2 to 14 hours. Gas-phase aluminizing can also be used. In this case, the blade neck 4 and the blade root 5 can remain without aluminizing if these regions are appropriately covered. Preferably, the aluminum activity can lie in the range of 0.15 to 0.35. Mixtures of aluminum oxide powder, aluminum powder, and a halide as activator, are suitable as powder packs, so that aluminum can diffuse into the coating. Also, locally different protective coatings can be produced in the aluminizing by using different aluminum activities locally. In this case, the aluminizing can be produced differently locally either only for uniformly produced Cr-rich coatings, or aluminizing can be combined with the above-described locally different chromizing.

A diffusion annealing at a temperature greater than or equal to 1050° C. over a time of 2 to 8 hours can additionally be conducted after the chromizing and aluminizing. The aluminizing and/or chromizing described here is also stable for the inner coating of hollow blades or vanes.

Before, during or after the chromizing and/or aluminizing, a surface treatment can be carried out by physical vapor deposition (PVD), chemical vapor deposition (CVD), lacquering, electrolytic deposition, and/or direct application of a substance, in which one or more elements from the group that comprises platinum, palladium, hafnium, zirconium, yttrium and silicon is/are applied. One or more of these elements can thereby be introduced into the coating in order to additionally positively influence the coating properties.

In the example of embodiment, a coating of the entire component, thus of the entire rotating blade, can be described with one of the coatings of aluminum and/or chromium according to the invention. Of course, however, the combination of a protective coating with aluminum-chromium coatings according to the invention is also possible in combination with other known protective coatings.

In the aluminum-chromium protective coating according to the invention, the concept of the coating, as already explained above, is not only a covering of the deposited aluminum and chromium on the original component surface, but the protective coating can also extend from the original component surface, from outside to inside, to the inside of the material.

Also, in the description of the invention, only the formation of an outer surface coating has been discussed, which, however, can only be part of the coating making up the protective coating system produced, so that in one direction crosswise to the component surface in the direction to the inside of the material, additional coating parts that are different in their composition and structure can be formed.

Although the present invention has been described in detail on the basis of the exemplary embodiments, it is obvious to the person skilled in the art that the invention is not limited to these exemplary embodiments, but rather that modifications are possible in such a way that individual features are omitted or other types of combinations of features can be realized, without leaving the scope of protection of the appended claims. In particular, the present disclosure encompasses all combinations of the individual features shown in the different examples of embodiment, so that individual features that are described only in conjunction with one exemplary embodiment can also be used in other exemplary embodiments or combinations of individual features that are not explicitly shown can also be employed.

What is claimed is:

1. A blade or vane for a turbomachine, comprising:
a blade element for interacting with a flow medium, wherein the blade or vane has different diffusion protective coatings in various regions on its surface for protection against corrosion and/or oxidation, wherein the diffusion protective coatings are produced by chromizing and/or aluminizing;
wherein the blade element is divided into two regions along the longitudinal axis of the blade element, wherein the first region extends over 80 to 95% of the length of the blade element, and the second region extends over the remainder of the length of the blade element, and wherein in both regions, an AlCr diffusion protective coating is applied, and wherein in one of the regions, the AlCr diffusion protective coating has a higher Cr content, and
wherein at one end of the blade element, the blade or vane has a shroud, which has the same diffusion protective coating as the adjacent region of the blade element.

2. The blade or vane according to claim 1, wherein the blade or vane has a blade root for arrangement in a disc of the turbomachine, a blade platform between blade root and blade element for covering the blade root, and a blade neck between blade root and blade element, in the region of which is arranged on the blade platform, wherein an AlCr diffusion protective coating with a Cr percentage that is higher than in the AlCr diffusion protective coatings of the first and second regions of the blade element is formed on the blade platform, whereas Cr diffusion protective coatings are applied in the region of the blade root and the blade neck.

3. The blade or vane according to claim 2, wherein the blade or vane is a rotating blade and the shroud is arranged at the blade tip at the end of the blade element that faces away from the blade root.

4. The blade or vane according claim 2, wherein the AlCr diffusion protective coating, on the blade platform, has an Al percentage of greater than or equal to 5 wt. % and a Cr percentage of 35 to 85 wt. %, wherein the ratio of chromium to aluminum lies in the range of greater than or equal to 3.

5. The blade or vane according to claim 2, wherein the Cr diffusion protective coating has a thickness in the range of 0.015 to 0.03 mm at the blade root.

6. The blade or vane according to claim 1, wherein the first region extends over 90% of the length of the blade element and is arranged adjacent to the shroud.

7. The blade or vane according to claim 1, wherein, in the second region of the blade element, the AlCr diffusion protective coating has a higher Cr percentage than in the first region of the blade element.

8. The blade or vane according to claim 1, wherein the AlCr diffusion protective coating, in the first region of the blade element, has an Al percentage of 16 to 28 wt. % and a Cr percentage of at least 5 wt. %, wherein the ratio of chromium to aluminum lies in the range of less than or equal to 2, particularly in the range of less than or equal to 1.5.

9. The blade or vane according to claim 1, wherein the AlCr diffusion protective coating, in the second region of the blade element, has an Al percentage of 12 to 28 wt. % and a Cr percentage of 24 to 85 wt. %, wherein the ratio of chromium to aluminum lies in the range of greater than or equal to 1.3 to less than or equal to 4.4.

10. The blade or vane according to claim 1, wherein the different diffusion protective coatings have as remainder, in addition to Cr and/or Al, constituents of a base alloy.

11. The blade or vane according to claim 1, wherein the different diffusion protective coatings have a thickness in the range of 0.015 to 0.1 mm and the AlCr diffusion protective coatings have a thickness in the range of 0.04 to 0.1 mm.

12. The blade or vane according to claim 1, wherein the blade or vane is a semi-finished blade that is chromized and/or aluminized.

* * * * *